US007415896B2

(12) United States Patent
Khoury et al.

(10) Patent No.: US 7,415,896 B2
(45) Date of Patent: Aug. 26, 2008

(54) CAPACITIVE FORCE AND ANGLE SENSOR

(75) Inventors: Joseph Elias Khoury, Gensingen (DE); Hans-Juergen Walther, Wiesbaden (DE); Juergen Korn, Oberheimbach (DE)

(73) Assignee: Methode Electronics International GmbH, Gau-Algesheim (DE)

( * ) Notice: Subject to any disclaimer, the term of this patent is extended or adjusted under 35 U.S.C. 154(b) by 50 days.

(21) Appl. No.: 11/371,230

(22) Filed: Mar. 9, 2006

(65) Prior Publication Data
US 2007/0062302 A1   Mar. 22, 2007

(30) Foreign Application Priority Data
Mar. 9, 2005   (DE)   ............. 10 2005 010 909

(51) Int. Cl.
G01L 3/02   (2006.01)
(52) U.S. Cl. .......................................... 73/862.193
(58) Field of Classification Search ............ 73/862.193, 73/193
See application file for complete search history.

(56) References Cited
U.S. PATENT DOCUMENTS

| 4,719,538 | A  | * | 1/1988 | Cox ..................... 361/283.2 |
| 6,564,654 | B2 | * | 5/2003 | Madni et al. ........... 73/862.337 |
| 6,772,646 | B1 | * | 8/2004 | Madni et al. ........... 73/862.337 |
| 2003/0010138 | A1 | * | 1/2003 | Madni et al. ........... 73/862.337 |
| 2005/0223811 | A1 | * | 10/2005 | Bonin .................... 73/780 |
| 2007/0180924 | A1 | * | 8/2007 | Warren et al. .......... 73/780 |

* cited by examiner

Primary Examiner—Max Noori
(74) Attorney, Agent, or Firm—Jacobson Holman PLLC

(57) ABSTRACT

The invention relates to a force and angle sensor for measuring the angle of rotation of a shaft (3) and a force exerted on a torsion rod (303), which interconnects two shaft parts (32, 33) of the shaft (3). In a housing (2), through which the shaft (3) runs, are arranged a main circuit board (4) arranged non-rotatably in relation to the housing (2) and which has a central opening (12), through which the shaft (3) runs, a first circuit board (5) for measuring the angle of rotation arranged non-rotatably on a first shaft part (32) on one side of the main circuit board (4), said first circuit board having a central opening (51) through which the first shaft part (32) runs, and a second circuit board (6) for measuring the force connected non-rotatably to the other shaft part (33) on the other side of the main circuit board (4), said second circuit board having a central opening (51) through which the other shaft part (33) runs. The planes of the main circuit board (4), of the first circuit board (5) and of the second circuit board (6) each run perpendicularly to the longitudinal axis of the shaft (3). Mutually opposing electrodes for measuring the angle of rotation and/or the force and for the capacitive measurement of the twist between the first circuit board (5) and the main circuit board (4) and/or the twist between the second circuit board (6) and the first circuit board (5) are arranged on the surfaces of the main circuit board (4) and of the first circuit board (5), said surfaces being turned towards one another, and also on the surfaces of the main circuit board (4) and of the second circuit board, said surfaces being turned towards one another.

17 Claims, 4 Drawing Sheets

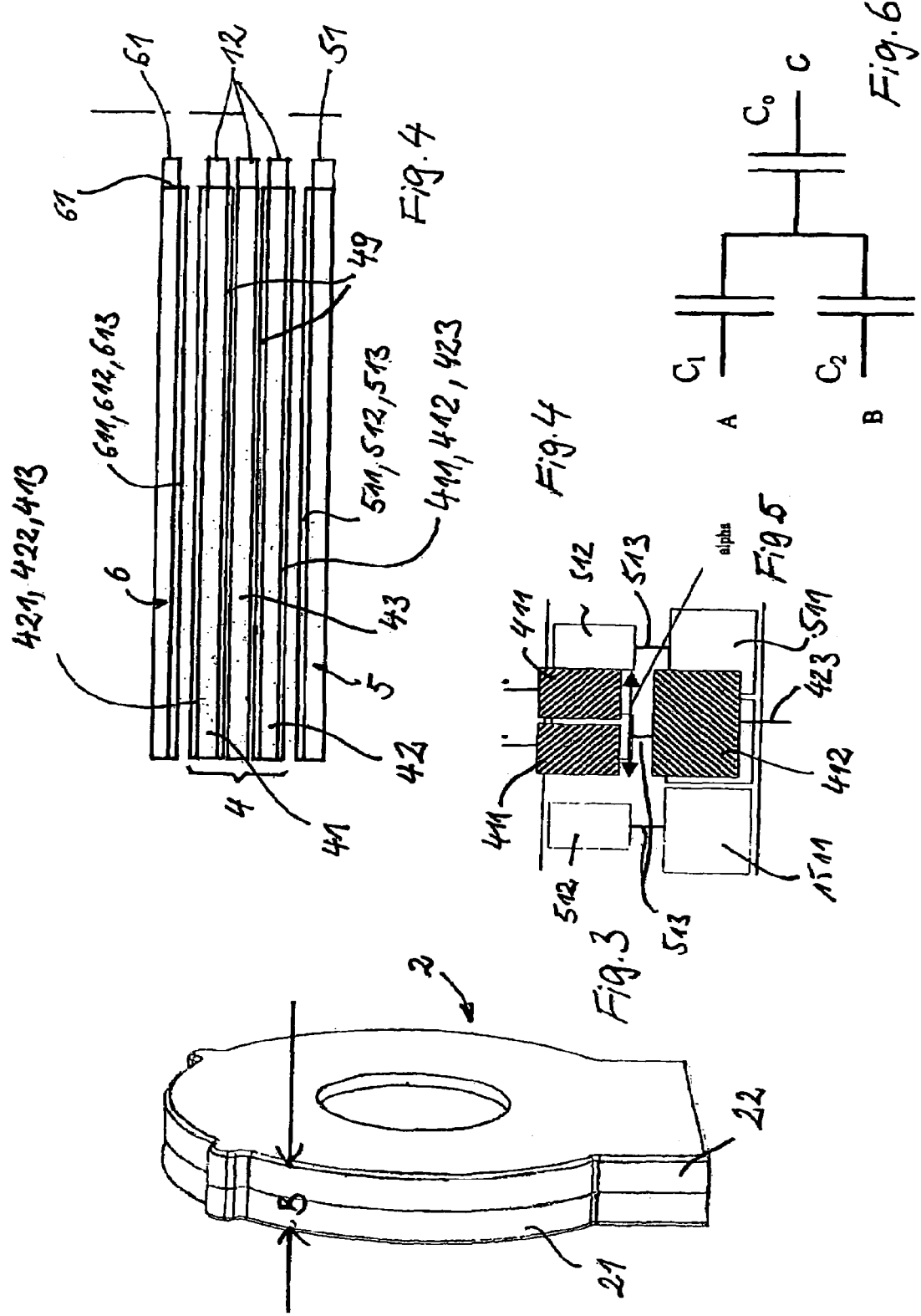

CAPACITIVE FORCE AND ANGLE SENSOR

The present invention relates to a capacitive force and angle sensor according to the preamble of main claim 1.

In motor vehicles, it is known to measure both the angle of rotation of the steering column about which the steering column is rotated during the driving of the motor vehicle and also the force exerted on the steering column, i.e. the angle of torsion of the steering column. The angle of torsion is created using a likewise known torsion rod, which is located inside the steering column and interconnects two shaft parts of the steering column.

The object of the present invention is to create the most compact possible force and angle sensor having a small overall height, said sensor being mountable in a relatively easy and space-saving manner, for example, on the steering column of a motor vehicle.

This object is attained by a force and angle sensor having the features of claim 1.

The essential advantage of the invention is that the present force and angle sensor has such a small overall height that it can be integrated, for example, into the housing of the spiral spring of an airbag release system, which is arranged on the steering column of a motor vehicle and is connected upstream of the gas generator of the airbag. In doing so, it is possible to simultaneously measure and/or record both the force exerted on the steering column using a torsion measurement and also the angle about which the steering column is rotated.

Preferred embodiments of the invention are based on the dependent clauses.

The invention and the embodiments thereof are explained in more detail in the following in conjunction with the figures, of which:

FIG. 1 schematically illustrates a section of the inventive force and angle sensor;

FIG. 3 illustrates the inventive force and angle sensor shown in FIG. 2 in the assembled state;

FIG. 4 illustrates the structure of the individual circuit boards of the inventive force and angle sensor;

FIGS. 5 and 6 are illustrations for explaining the functioning of the inventive force and angle sensor;

Figure 1:
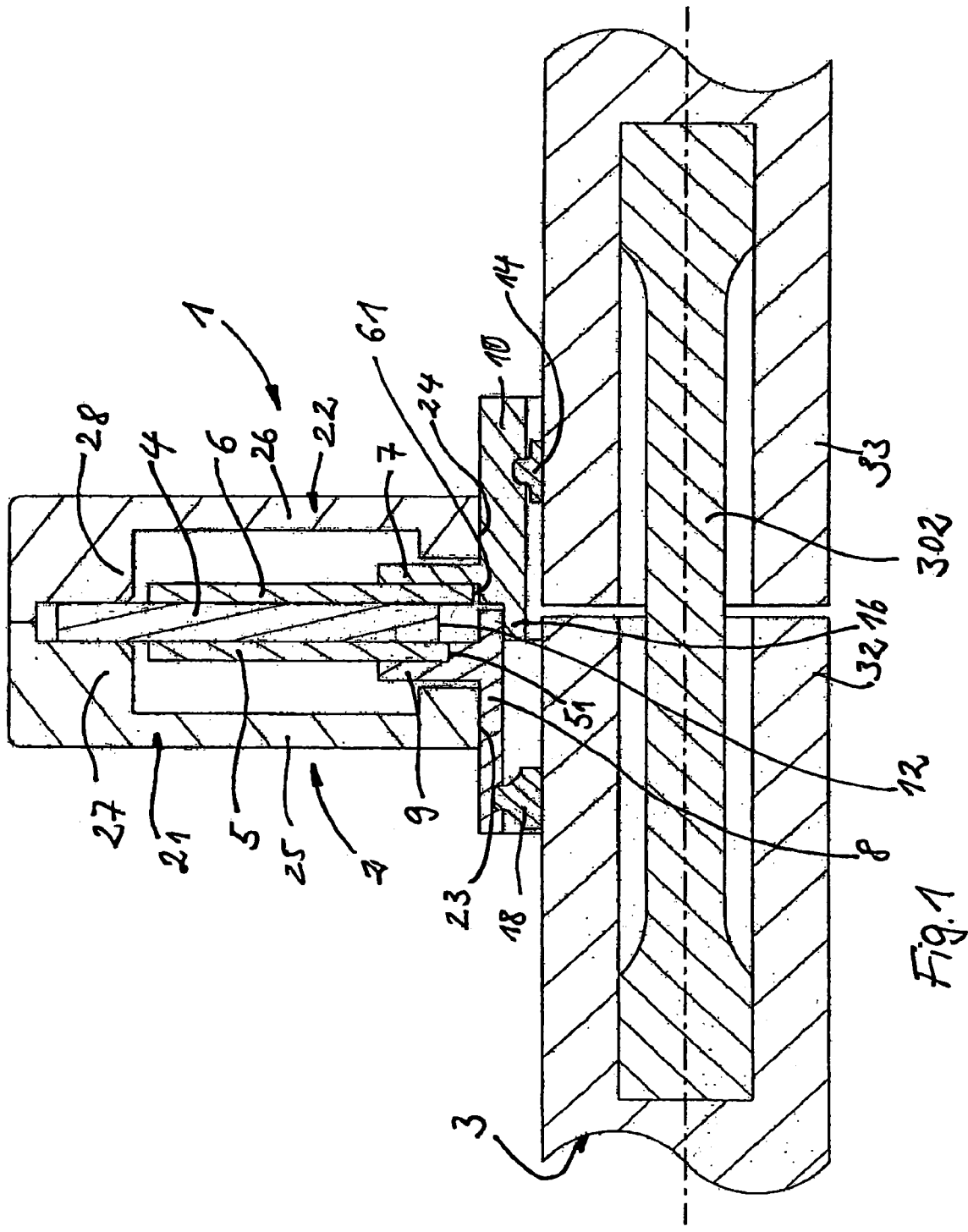

The present force and angle sensor 1 substantially consists of a housing 2, which can be arranged on a shaft, especially on the steering column 3 of a motor vehicle, a main circuit board 4, a reflecting circuit board 5 for measuring the angle of rotation and a reflecting circuit board 6 for measuring the force and/or the torque. The steering column 3 runs through an opening in the housing 2 in such a way that said steering column is twistable in relation to the statically arranged housing 2. The housing 2 is fixed, for example, in a housing (not illustrated in more detail) of the spiral spring of an airbag release system. The housing 2 preferably consists of two housing parts 21 and 22, which are arranged next to one another and attached to one another, when seen in the longitudinal direction of the steering column 3. The housing part 21 has a central opening 23 and the housing part 22 has a central opening 24. The steering column 3 runs through these openings 23 and 24.

Every housing part 21, 22 comprises a wall part 25 and 26 respectively, which runs perpendicularly to the steering column 3 and a flange part 27 and 28 respectively, which is attached to the wall part outside in the radial direction and which runs in the direction of the steering column 3. The flange parts 27 and 28 are fixed to one another, preferably screwed to one another, as a result of which they form a receiving space for the main circuit board 4 and the circuit boards 5 and 6.

The steering column 3 is divided in the region of the housing 2 into two shaft parts 32, 33, which are aligned axially to one another according to FIG. 1 and which are interconnected using a torsion rod 302, of which each side engages non-rotatably in a shaft part 32 and 33 respectively.

FIG. 4 schematically illustrates the structure of the preferably circularly embodied main circuit board 4 and also the reflecting circuit boards 5 and 6, which are also preferably embodied circularly. The main circuit board 4 preferably consists of a three-layer circuit board laminate using laminar technology, wherein said laminate will be explained in more detail subsequently. On its side turned towards the main circuit board 4, the circuit board 5 comprises the transmitting electrodes 511, the receiving electrodes 512 and also corresponding conductor tracks 513. On its side turned towards the main circuit board 4, the circuit board 6 comprises the transmitting electrodes 611, the receiving electrodes 612 and also conductor tracks 613. The main circuit board 4 arranged between the circuit boards 5, 6 comprises a middle support layer 43, a circuit board part 41 turned towards the circuit board 6 and a circuit board part 42 turned towards the circuit board 5. On its side turned towards the circuit board 6, the circuit board part 41 comprises the transmitting electrodes 421, the receiving electrodes 422 and also corresponding conductor paths 413. On its side turned towards the circuit board 5, the circuit board part 42 comprises the transmitting electrodes 411, the receiving electrodes 412 and conductor tracks 423 (also see FIG. 2). Said conductor tracks, transmitting and receiving electrodes preferably have the form of metal tracks or copper tracks arranged on their respective supports.

Figure 2:
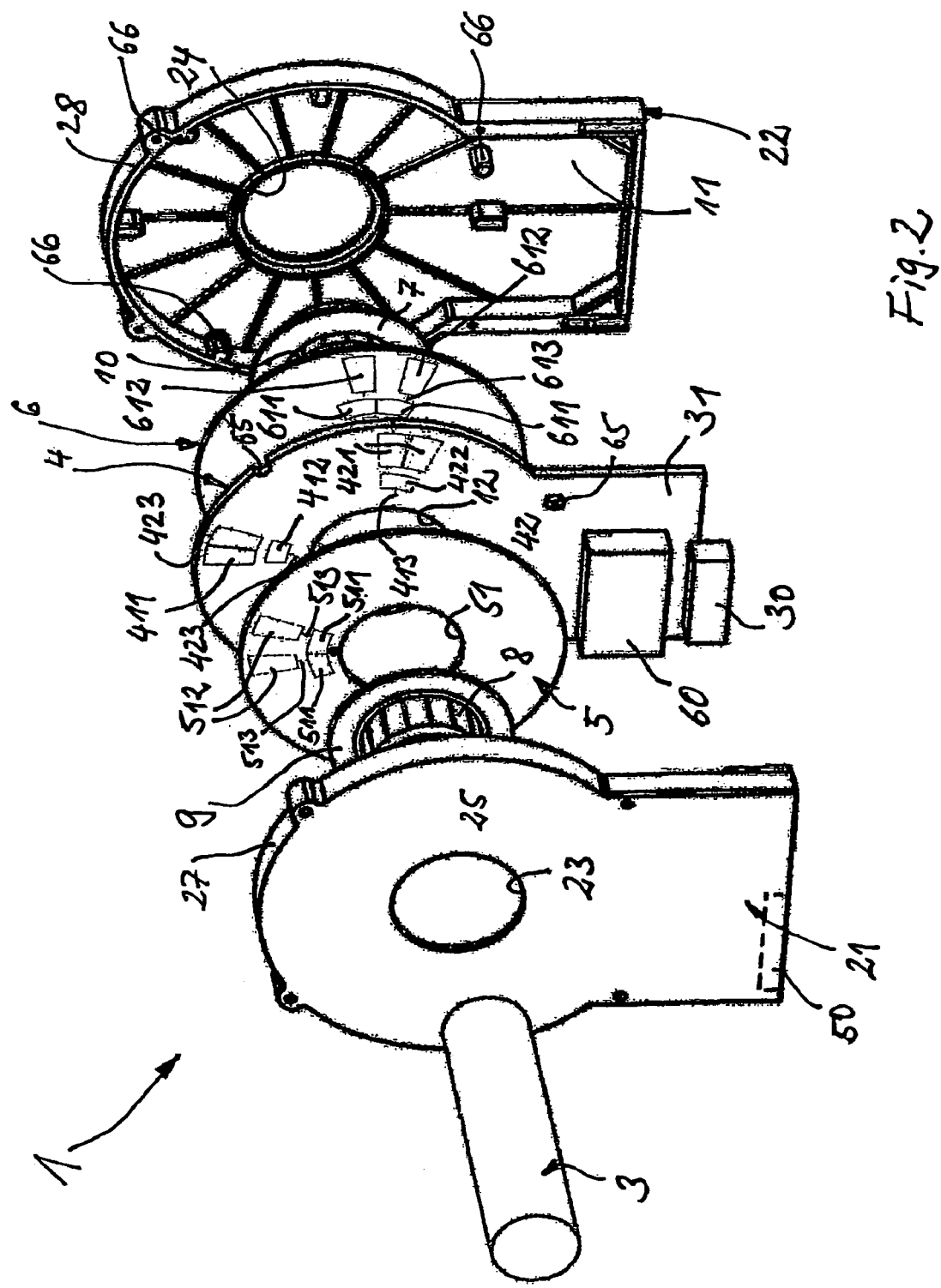
FIG. 2 illustrates a perspective exploded view of the inventive force and angle sensor.

On their sides turned towards the support layer 43, the circuit board parts 41 and 42 each have conductor tracks 49, which create connections using corresponding through-connections (not illustrated) between the conductor tracks 413 of the circuit board part 41 and/or between the conductor tracks 423 of the circuit board part 42 and outer contact elements 30, which are fixed preferably in the form of a contact strip or the like to a region 31, which is extended outwards over the peripheries of the circuit board parts 41, 42 and also of the support layer 43. A component forming an evaluation electronics 60, e.g. in the form of a micro-controller, can also be arranged next to the contact elements 30 in this region 31, as illustrated in FIG. 2.

The main circuit board 4 is non-rotatably arranged on the housing 2, wherein the housing 2 is preferably provided with a recess 11, in which the region 31 protruding radially over the periphery of the circularly embodied main circuit board 4 engages. The recess 11 preferably has the form of a depression in the housing part 22, wherein said depression is open towards the opposite housing part 21 and is closed by the other housing part 21, if the latter is fixed to the housing part 22, after the insertion of the region 31 of the main circuit board 4. The contact elements 30 are then accessible from the outside using a housing recess 50. The region 31 is fixed in the recess 11 so as to eliminate relative rotary motions between the housing 2 and the main circuit board 4. However, said fixing can also be carried out using other means.

Preferably, the wall parts 25, 26 of the housing parts 21 and/or 22 are also embodied circularly.

The main circuit board 4 or preferably the interconnected circuit board parts 41 and 42 embodied expediently circularly and also the support layer 43, which is also preferably embodied circularly each have a central opening 12 through which the steering column 3 runs after the installation of the force and angle sensor 1.

The circuit board 5 used advantageously for measuring the angle of rotation has a central opening 51 through which the steering column 3 runs. The circuit board 6 has a corresponding central opening 61. The circuit board 5 for measuring the angle of rotation is connected non-rotatably to the shaft part 32 and thus also to one side of the torsion rod 302. For this purpose, the circuit board 5 is preferably arranged on a socket 8, which is arranged non-rotatably on the shaft part 32 and which in the assembled state runs through the opening 23 of the housing part 21, through the opening 12 of the main circuit board 4 and also the opening 51 of the circuit board 5, wherein the housing parts 21 and the circuit board part 41 of the main circuit board 4 are supported twistably in relation to the socket 8.

The socket 8 comprises a radially projecting flange element 9, against which the circuit board 5 rests in the assembled state, wherein the flange element 9 is preferably locked in place on the circuit board 5 for the torque-proof connection of the circuit board 5 to the socket 8. Therefore the circuit board 5 fixed non-rotatably on the steering column 3 for measuring the angle of rotation is twisted in order to measure the angle of rotation in relation to the main circuit board 4 arranged non-rotatably on the housing 2 in case of a torsion of the steering column 3. The associated method for measuring the angle of rotation is explained subsequently in more detail.

The socket 8 and the socket 10 explained in more detail subsequently are each connected using tappet parts 18 and/or 14 to the shaft part 32 and/or the shaft part 33 and thus also to the torsion rod 302.

According to FIG. 1, the circuit board 6 for measuring the force and/or for measuring the torque is connected non-rotatably to the shaft part 33 using a tappet device, wherein the torsion rod 302 supplies the torque using the torsional angle of the shaft part 33 in relation to the shaft part 32 of the steering column 3 for measuring the torque.

The tappet device has the form of a socket 10, which has a radially protruding flange element 7 against which the circuit board 6 rests in the assembled state, wherein the flange element 7 is fixed to the circuit board 6, preferably locked in place, for the torque-proof connection of the circuit board 6 to the socket 10.

In the assembled state, the socket 10 runs through the opening 24 of the housing part 22 and preferably through the opening 12 of the main circuit board 4 and/or of the circuit board parts 41, 42 and of the support layer 43. An axial projection region 16 of the socket 10 expediently engages in the opening of the socket 8 for reasons of stability and support. Alternatively, a projection region of the socket 8 can also engage in the opening of the socket 10. The housing part 22 and the main circuit board 4 are arranged twistably in relation to the steering column 3.

Due to its design explained above and the tight arrangement of its components on one another in the axial direction, the present force and angle sensor 1 has an overall height B (FIG. 3), which is very small and can be below 8 mm, even if said force and angle sensor comprises the evaluation electronics 60.

Generally speaking, the measurement of the angle of rotation takes place using the radial torsion of the circuit board 5 fixed to the steering column 3 and/or to the shaft part 32 of the steering column 3 in relation to the main circuit board 4 fixed to the housing 2.

The force measurement takes place using the torsion of the shaft part 32 of the steering column 3 in relation to the shaft part 33 of the steering column 3, wherein the spring rate of the torsion rod 302 supplies the torque using the torsional angle. The torsional angle of the torsion rod 302 is measured using the relative twist of the circuit board 6 for measuring the force in relation to the circuit board 5 for measuring the angle of rotation, i.e. using the twist of the torsion rod 302. The relative twist is preferably carried out using two separate angle measurements. The first angle measurement is determined from a measurement of the angle of rotation using the circuit board 5. The second angle measurement is determined using the circuit board 6. The difference in both the angles results in the torsional angle. This torsional angle is proportional to the torque, which loads the torsion rod 302.

The shaft parts 32, 33 of the steering column 3 and also the torsion rod 302 are not direct components of the present sensor system.

The capacitive measuring method using the present force and angle sensor is explained in more detail in the following. On their surfaces turned towards one another, the circuit board parts 41, 42 and also the circuit boards 5, 6 each comprise the afore-mentioned transmitting electrodes 411, 421, 511 and/or 611. Furthermore, said surfaces of the main circuit board 4 and also of the circuit boards 5, 6 each comprise the afore-mentioned receiving electrodes 412, 422, 512 and/or 612. Said electrodes are each distributed evenly over a periphery of a predetermined diameter of said circuit board parts and/or circuit boards, wherein the transmitting electrodes of the main circuit board 4 are each located opposite to receiving electrodes of the circuit boards 5, 6 on a preferably larger diameter, while the receiving electrodes of the circuit board parts 41, 42 are located opposite to transmitting electrodes of the circuit boards 5, 6 on a preferably smaller diameter. The individual electrodes each are preferably made of copper, which is arranged on the insulating material of the main circuit board 4 and/or of the circuit boards. Said electrodes each have the form of circle sectors or a triangular form. Only two electrodes of each type of electrodes are illustrated in FIG. 2 for the sake of simplicity, wherein the electrodes, which are not visible per se, are represented by broken lines.

FIG. 5 shows this by way of example in a simplified illustration of the transmitting electrodes 411 of the circuit board part 41, the opposite receiving electrodes 512 of the circuit board 5 and also the transmitting electrodes 511 of the circuit board 5 and the opposite receiving electrodes 412 of the circuit board part 41.

Alternating voltage signals having the same frequency are applied to each of the transmitting electrodes 411. These alternating voltage signals have a variable phase position.

Depending on the overlapping of the smaller receiving electrodes 512, the signals are transmitted with varying strength. The sum of the alternating voltage signals launched using the receiving electrodes 412 is sent back to the receiving electrode 412 using the larger transmitting electrodes 511, which are connected to the receiving electrodes 512 using conductor tracks 513. The receiving signal now has a phase position, which is directly linked to the twist of the circuit board 5. As illustrated in FIG. 5, the relative angle in the angle range a can be determined using the phase position of the receiving signal.

The overlapping surfaces of the electrodes 411 and 512 each form a plate capacitor whose capacity according to the simplified equivalent circuit diagram of FIG. 6 is proportional to the overlapping surface. FIG. 6 thereby illustrates the simplified electrical interrelationship. The capacitor C1 increases with the angle of rotation and the capacitor C2 reduces with the angle of rotation. The capacitor C0 is the regenerating capacitor, the capacity of which remains constant.

Sine-wave signals having variable phase displacement are launched to the input A and B of the measuring system. The size of the capacitors C1 and C2 is directly linked mechanically. The dependency on the torsional angle $\alpha$ can be described using the equation (1). The following equation holds true:

$$C_1(\alpha) = C \cdot \alpha$$

$$C_2(\alpha) = C \cdot (1-\alpha) \quad (1)$$

The output signal C is a sine-wave signal having a phase displacement depending on the twist $\alpha$. The following equation (2) shows the mathematical interrelationship between the twist $\alpha$ and the resulting phase $\phi$ of the measurement signal. The changing amplitude is not taken into consideration. The following equation holds true:

[see source for figure] (2)

Figures 7, 8:
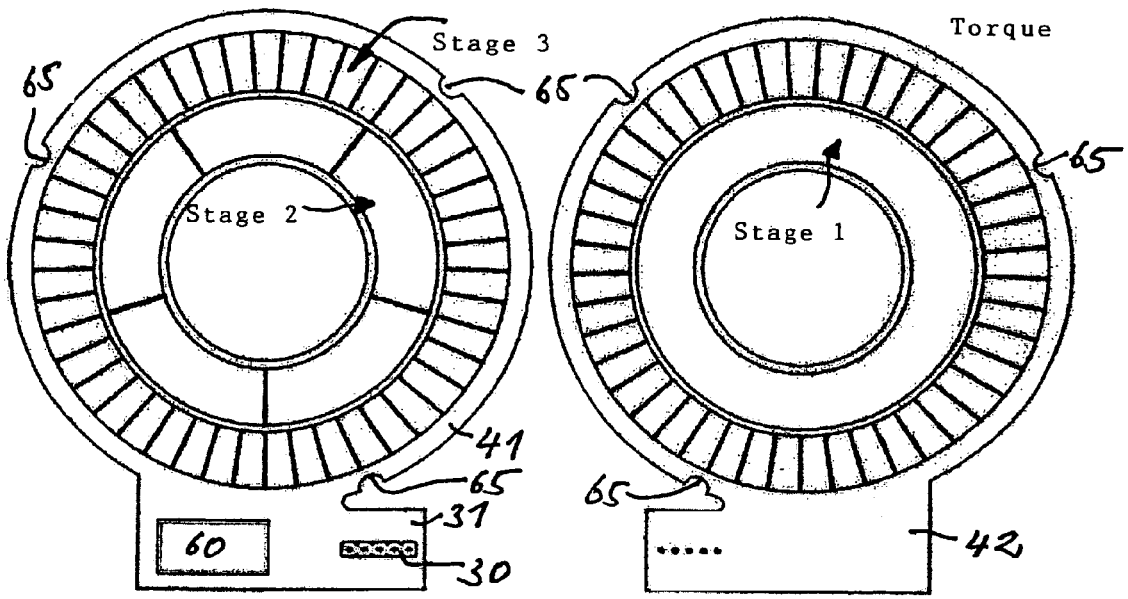
FIGS. 7 and 8 are illustrations for explaining an improved configuration of the invention.
Figure 9:
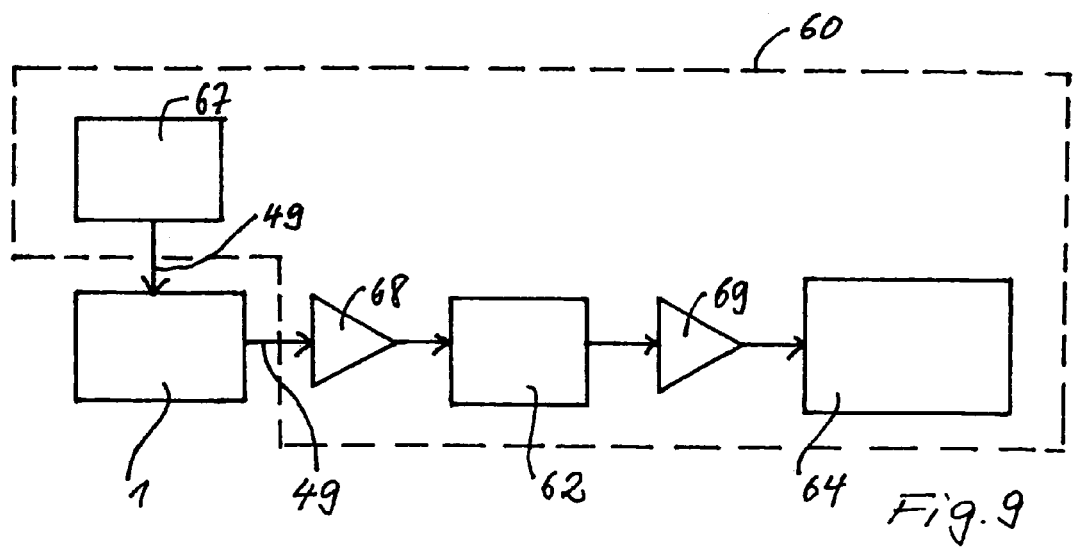
FIG. 9 is a block diagram of the preferred electronics of the inventive force and angle sensor.

For increasing the accuracy of the angle measurement, the angle is determined preferably in three stages, namely stage 1, stage 2 and stage 3 as illustrated in FIGS. 7 and 8. In stage 1, the complete angle is accommodated in one sector. The electrode system explained in connection with FIG. 2 is present only once in stage 1. Stage 2 comprises 5 sectors, each of which contains a measurement system. Stage 3 comprises 45 sectors, each of which contains a measurement system. Stage 1 is accommodated in the inner region of the circuit board part 42 as illustrated in FIG. 8.

According to FIG. 7, stage 2 is accommodated in the inner region of the circuit board part 41 for the angle measurement. Stage 3 is arranged in the outer region of the circuit board part 41 for the angle measurement, as also illustrated in FIG. 7. The sectors of stage 3 are also present in the outer region of the circuit board part 42 (FIG. 8). The circuit boards 5 and 6 are embodied accordingly. The separation of stage 1 from stage 2 on the two circuit board parts 41 and 42 is possible because the relative angle between both the circuit boards 5, 6 is very small. A relatively small twist of the steering column 3 has no effect on the angle measurement.

The out-of-phase signals of the three stages are recorded simultaneously. This enables angle measurements at a high rotational speed.

The absolute angle is determined using the values of the three stages. Three digital values are present for the calculation: one value (maximum digital value "Byte" at 10 bits data depth: 1024) for every stage. The first stage consists of one sector. The second stage consists of X sub-sectors and the third stage consists of Y sub-sectors. The measurement of the first stage determines the sector X and the second measurement result determines the sector Y. The third measurement result shows the position in the Y sector. The measurement results of the first stage and of the second stage for the determination of the sector Y have tolerances. These tolerances are balanced using the equations (3), (4) and (5). The following equations hold true:

[Stufe=stage]

[see source for figures] (3)
(4)
(5)

The outer region of the circuit board 6 for the force measurement is necessary for the required second angle measurement. The outer regions of the reflecting circuit boards 5, 6 are similar in their design. The difference in the two angles results in the torsional angle of the shaft.

The generation of the transmitting signals preferably takes place using a signal generator 67, which is contained in the evaluation electronics 60. The signals generated by the signal generator 67 are applied to the force and angle sensor 1 using said conductor tracks 49. The signals determined by the force and angle sensor 1 are fed to the evaluation electronics 60 again using conductor tracks 49 and are amplified in the evaluation electronics 60 by an amplifier 68. The signals are subsequently filtered by a bandpass filter 62 and given by a comparator 69, which generates a square-wave signal having a certain phase displacement from the sine-wave signal fed to it by the bandpass filter 62. Finally, the comparator 64 then generates the result signal for the measurement of the phase displacement.

An evaluation electronics 60, which is already present expediently in a module form is preferably used for the analogue evaluation, e.g. a microcontroller, which comprises the analogue components on an integrated circuit. Then special external circuits advantageously become no longer necessary. The preparation of the four measurement signals takes place in parallel in the evaluation electronics 60.

Four phases are recorded in the time-frame of a period of the carrier frequency. This means a measurement duration of 272 μs.

REFERENCE SYMBOLS

1 Force and angle sensor
2 Housing
3 Steering column
4 Main circuit board
5 Circuit board
6 Circuit board
7 Flange element
8 Socket
9 Flange element
10 Socket
11 Recess
12 Opening
14 Tappet part
16 Projection region
18 Tappet part
21 Housing part
22 Housing part
23 Opening
24 Opening
25 Wall part
26 Wall part
27 Flange part
28 Flange part
30 Contact elements
31 Region
32 Shaft part
33 Shaft part
41 Circuit board part
42 Circuit board part
43 Support layer
49 Conductor tracks
50 Housing recess
51 Opening
60 Evaluation electronics
61 Opening
62 Bandpass filter
64 Comparator 65 Recess
66 Projection
67 Signal generator
68 Amplifier
69 Comparator
302 Torsion rod
411 Transmitting electrodes
412 Receiving electrodes
413 Conductor tracks
421 Transmitting electrodes
422 Receiving electrodes
423 Conductor tracks
511 Transmitting electrodes
512 Receiving electrodes
513 Conductor tracks
611 Transmitting electrodes
612 Receiving electrodes
613 Conductor tracks

The invention claimed is:

1. Force and angle sensor for measuring the angle of rotation of a shaft and a force exerted on a torsion rod which interconnects first and second parts of the shaft, said force and angle sensor comprising:
    a housing through which said shaft runs;
    a main circuit board which is arranged non-rotatably in relation to the housing and which has a central opening through which the shaft runs;
    a first circuit board arranged in said housing for measuring the angle of rotation arranged non-rotatably on the first shaft part on one side of the main circuit board, said first circuit board having a central opening through which the first shaft part runs;
    a second circuit board arranged in said housing for measuring the force connected non-rotatably to the second shaft part on the other side of the main circuit board, said second circuit board having a central opening through which the second shaft part runs;
    planes of the main circuit board, of the first circuit board and of the second circuit board each running perpendicularly to the longitudinal axis of the shaft;
    mutually opposing electrodes for measuring the angle of rotation and/or the force and for the capacitive measurement of the twist between the first circuit board and the main circuit board and/or the twist between the second circuit board and the first circuit board being arranged on a first surface of the main circuit board and on a first surface of the first circuit board that faces said first main circuit board surface, and also on a second surface of the main circuit board and on a first surface of the second circuit board that faces said second main circuit board surface;
    electrodes on the first surface of the main circuit board including first transmitting electrodes distributed along a first periphery of the main circuit board and first receiving electrodes distributed along a second periphery of the main circuit board;
    electrodes on the second surface of the main circuit board including second transmitting electrodes distributed along a third periphery of the main circuit board and second receiving electrodes distributed along a fourth periphery of the main circuit board;
    electrodes on the first surface of the first circuit board facing said first main circuit board surface including third receiving electrodes lying opposite to the first transmitting electrodes of the main circuit board and third transmitting electrodes located opposite to the first receiving electrodes of the main circuit board; and
    electrodes on the first surface of the second circuit board facing said second main circuit board surface including fourth receiving electrodes located opposite to the second transmitting electrodes of the main circuit board and fourth transmitting electrodes lying opposite to the second receiving electrodes of the main circuit board; and
    transmitting signals being transmitted from the first transmitting electrodes to the third receiving electrodes, from the third receiving electrodes to the third transmitting electrodes, and from the third transmitting electrodes to the first receiving electrodes, and transmitting signals also being transmitted from the second transmitting electrodes to the fourth receiving electrodes, from the fourth receiving electrodes to the fourth transmitting electrodes, and from the fourth transmitting electrodes to the second receiving electrodes.

2. The force and angle sensor according to claim 1, wherein for a torsion-proof connection, the first circuit board is connected to the first shaft part of the shaft using a first socket, and a first tappet part for the first socket is fixed to the first shaft part.

3. The force and angle sensor according to claim 1, wherein for a torsion-proof connection, the second circuit board is connected to the second shaft part of the shaft using a second socket, and a second tappet part for the second socket is fixed to the second shaft part.

4. The force and angle sensor according to claim 2, wherein a second surface of the first circuit board that faces away from the main circuit board rests against a flange element of the first socket, which is fixed on the first circuit board.

5. The force and angle sensor according to claim 3, wherein a second surface of the second circuit board that faces away from the main circuit board rests against a flange element of the second socket which is fixed on the second circuit board.

6. The force sensor and angle sensor according to claim 1, wherein the main circuit board includes of a first circuit board part and a second circuit board part arranged parallel to one another, the first transmitting electrodes and the first receiving electrodes being arranged on the first circuit board part which includes a central opening, the second transmitting electrodes and the second receiving electrodes being arranged on the second circuit board part which also includes a central opening, the first circuit board part and the second circuit board part being interconnected in such a way that the central opening of the first circuit board part is aligned to the central opening of the second circuit board part, and, on surfaces of the first circuit board part and of the second circuit board part that face one another, additional conductor tracks each running from an external location to the first transmitting electrodes arranged on the first circuit board part and to the second transmitting electrodes arranged on the second circuit board part and from each of the first receiving electrodes and from the second receiving electrodes of the second circuit board part to the external location.

7. The force and angle sensor according to claim 6, wherein the additional conductor tracks are each connected using through-connections of the first circuit board part and/or of the second circuit board part to the first transmitting electrodes and/or the second transmitting electrodes and/or the first receiving electrodes and/or the second receiving electrodes.

8. The force and angle sensor according to claim 1, wherein the first transmitting electrodes, the second transmitting electrodes, the first receiving electrodes, the second receiving electrodes, the third receiving electrodes, the third transmitting electrodes, the fourth receiving electrodes and the fourth transmitting electrodes are electroconductive metal surfaces arranged on the corresponding insulating surfaces of the first circuit board part and/or of the second circuit board part and/or of the first circuit board and/or of the second circuit board.

9. The force and angle sensor according to claim 8, wherein the metal surfaces are made of copper.

10. The force and angle sensor according to claim 8, wherein the metal surfaces have the form of circle sectors or a triangular form.

11. The force and angle sensor according to claim 1, wherein the housing includes two interconnectable housing parts, the main circuit board being non-rotatably connected at least to one housing part in the assembled state of the housing parts.

12. The force and angle sensor according to claim 11, wherein recesses or projections are arranged on the periphery of the main circuit board that engage non-rotatably with respective projections and/or recesses of the other housing part in the assembled state.

13. The force and angle sensor according to claim 6, wherein the conductor tracks lead using through-connections of the first circuit board part or of the second circuit board part to contact elements which are arranged on an outer side of the first circuit board part or of the second circuit board part and are accessible from the outside through a housing recess of the first housing part or of the second housing part in the assembled state of the first housing part and of the second housing part.

14. The force and angle sensor according to claim 6, wherein an evaluation electronics component is arranged on the external location and is connected to additional conductor tracks using through-connections of the first circuit board part or of the second circuit board part.

15. The force and angle sensor according to claim 6, wherein the main circuit board includes the first circuit board part and the second circuit board part together with a support layer in a circuit board laminate using laminar technology, said support layer being arranged between the first circuit board part and the second circuit board part, the first circuit board part including the second transmitting electrodes, the second receiving electrodes and second conductor tracks on a side facing the second circuit board and additional conductor tracks on a side facing away from the second circuit board, the second circuit board part including the first transmitting electrodes, the first receiving electrodes, first conductor tracks on a side facing the first circuit board and additional conductor tracks on a side facing away from the first circuit board, the second conductor tracks of the first circuit board part being connected using through-connections in the first circuit board part to the additional conductor tracks of the first circuit board part and the first conductor tracks being connected using through-connections in the second circuit board part to the additional conductor tracks of the second circuit board part.

16. The force and angle sensor according to claim 15, wherein the transmitting and receiving electrodes and also the conductor tracks are electroconductive metal surfaces.

17. The force and angle sensor according to claim 16, wherein the electroconductive metal surfaces are made of copper.

* * * * *